(12) United States Patent
Channell

(10) Patent No.: US 6,347,644 B1
(45) Date of Patent: Feb. 19, 2002

(54) BYPASS VALVE FOR WATER TREATMENT SYSTEM

(75) Inventor: Alan B. Channell, Columbia City, IN (US)

(73) Assignee: Chemical Engineering Corporation, Churubusco, IN (US)

( * ) Notice: Subject to any disclaimer, the term of this patent is extended or adjusted under 35 U.S.C. 154(b) by 0 days.

(21) Appl. No.: 09/518,810

(22) Filed: Mar. 3, 2000

(51) Int. Cl.[7] .............................................. F16K 11/20
(52) U.S. Cl. .............. 137/597; 137/599.15; 137/625.29
(58) Field of Search ........................... 137/599.14, 597, 137/599.15, 625.29

(56) References Cited

U.S. PATENT DOCUMENTS

| | | | |
|---|---|---|---|
| 1,108,153 A | * 8/1914 | Eells et al. | ......... 137/599.14 X |
| 2,604,293 A | 7/1952 | Phillips | |
| 2,854,027 A | 9/1958 | Kaiser et al. | |
| 3,339,583 A | 9/1967 | Fleckenstein et al. | |
| 3,678,960 A | 7/1972 | Leibinsohn | |
| 3,788,599 A | 1/1974 | Cloyd | |
| 3,834,372 A | 9/1974 | Turney | |
| 3,935,108 A | * 1/1976 | Forgues | ............. 137/599.14 X |
| 3,991,975 A | 11/1976 | Sibrava | |
| 4,003,403 A | 1/1977 | Nehring | |
| 4,147,182 A | * 4/1979 | Akerblom | .......... 137/599.14 X |
| 4,489,721 A | * 12/1984 | Ozaki et al. | ............ 128/205.24 |
| 4,688,599 A | 8/1987 | Zeman | |
| 4,890,817 A | 1/1990 | Uri | |
| 4,972,877 A | 11/1990 | Halemba et al. | |
| 5,037,067 A | 8/1991 | Ray | |
| 5,107,896 A | 4/1992 | Otto | |
| 5,139,050 A | 8/1992 | Otto | |
| 5,152,321 A | 10/1992 | Drager et al. | |
| 5,174,337 A | 12/1992 | Dahlen et al. | |
| 5,203,081 A | 4/1993 | Dahlen et al. | |
| 5,383,491 A | 1/1995 | Heilman | |
| 5,452,744 A | 9/1995 | Otto | |
| 5,584,411 A | 12/1996 | Channell et al. | |
| 5,628,899 A | 5/1997 | Vaughan | |
| 5,699,930 A | 12/1997 | Channell et al. | |
| 5,741,005 A | 4/1998 | Vaughan et al. | |
| 5,816,290 A | 10/1998 | Altshuler | |
| 5,820,133 A | 10/1998 | Altshuler | |

OTHER PUBLICATIONS

Exploded Perspective Drawing, Fleck By–Pass Valve Assembly.

* cited by examiner

Primary Examiner—Stephen M. Hepperle
(74) Attorney, Agent, or Firm—Baker & Daniels

(57) ABSTRACT

A water treatment system bypass valve assembly that includes a unique multi-functional auxiliary port. The auxiliary port may be fitted with a check valve that relieves vacuum drawn on the water treatment system to which the bypass assembly is connected, which may be caused by a water supply failure. The auxiliary port also provides easy access for sampling untreated water and adding chemicals to the treatment system. Additionally, the auxiliary port can be used as a conduit to transport treated water to the treatment system during regeneration thereof. Bosses are formed on the bypass valve assembly that can be later drilled and tapped to provide further access to the fluid passages of the bypass valve for pressure testing and sampling. The rotatable valves that switch the assembly from the service to bypass position are integrally formed and removably secured in the housing of the assembly without requiring any additional fasteners.

19 Claims, 8 Drawing Sheets

BYPASS VALVE FOR WATER TREATMENT SYSTEM

BACKGROUND

The present invention relates to a bypass valve for use with a water treatment system, and more particularly, to a multi-functional bypass valve.

Bypass valves for use with water treatment systems, such as filters and softeners, for example, are known in the art, and generally are formed as a housing which includes an adjustable valve therein. By adjusting the valve, one of two basic flow configurations can be selected. In the "service" configuration, the bypass valve merely conveys untreated water from a household or commercial supply line to the treatment system and conveys treated water exiting the treatment system to a pipe adapted for same. In the second, or "bypass," configuration, untreated water enters and exits the bypass valve whereas flow to and from the treatment system is blocked. A bypass valve provides a convenient way to divert water from the treatment system, which is desirable, for example, when untreated water is needed, when the system is leaking or otherwise malfunctioning, or when routine maintenance is being performed on the system.

For example, U.S. Pat. No. 4,972,877 to Halemba et al. discloses a bypass/diverter valve including four conduits extending from a cylindrical valve chamber into which three spaced ports open. Within the chamber is a rotatable plug whose rotation selectively communicates flow through the conduits. Flow through the valve may optionally be crossed over the assembly through the valve, such that the function of the inlet and outlet conduits of the bypass may be interchanged without requiring repositioning of the bypass.

U.S. Pat. No. 5,152,321 to Drager et al. discloses a bypass valve in which the valve body consists of an open-ended cylinder with two pairs of ports extending perpendicularly from the longitudinal axis of the cylinder. A valve element is rotatably and slidably received into the cylindrical valve body and is provided with a lever to rotate the valve between bypass and service positions. While in the bypass position, the valve element may be axially shifted within the cylinder to allow flow from one of the ports of the first pair with one of the ports of the second pair. In such a position, the treatment tank can be pressurized from the supply line while in the bypass position.

Another known bypass assembly is formed from a unitary housing and includes one conduit adapted to transport untreated water to the inlet of a treatment tank and a second conduit adapted to transport treated (or untreated) water from the outlet of the treatment tank to a supply line adapted for same. Rotatable valves are disposed in-line with each of the first and second conduits. A third conduit formed in the housing fluidly connects the first and second conduits when the two valves are positioned in the "bypass position," thereby allowing water to be channeled from the first conduit to the second conduit, bypassing the inlet and outlet of the treatment system. The manufacturing process of this known bypass assembly unavoidably results in a hole being formed in the housing coinciding with the end of the third conduit. A cap is secured to and fluidly seals this opening. One known bypass embodying this arrangement includes the cap being mechanically or chemically bonded to the housing, and the cap cannot be removed from the housing without destroying the bypass assembly.

One problem with known water treatment systems that is not addressed by the art described above nor other prior art water treatment systems known to applicant is that the water supply may occasionally fail, for example, when a water line is being serviced at a lower elevation than that of the treatment system. In such event, a vacuum may be created in the supply line, which in turn is communicated to the water treatment system, which further in turn may cause the treatment tank of the softener to buckle or "cave in" from the vacuum created therein. That is, the side wall of the media tank is sucked in, which causes a crease in the tank liner and the reinforced shell. When the treatment tank is later re-pressurized, it may leak or rupture. A deep set well pump that fails could create a similar problematic vacuum in the supply line. This is an obviously undesirable situation which usually requires costly replacement of the tank and media.

Another problem not addressed by prior art devices known to Applicant is that prior art water treatment systems must usually be disconnected from the incoming and outgoing lines, or the bypass valve must be disconnected, before chemicals can be added to the tank or before treated and/or untreated water can be sampled at the location of the water treatment system.

Yet another problem with known bypass valves is their lack of versatility generally. That is, known bypass valves provide one function, to bypass the treatment tank, nothing more.

What is needed is a water treatment system that addresses the above-noted problems and shortcomings of prior art bypass valve assemblies.

SUMMARY OF THE INVENTION

The present invention provides a multi-functional bypass assembly that includes a unique auxiliary port which in one embodiment is capable of relieving vacuum drawn on a water treatment system tank caused by a water supply failure. In other embodiments, the inventive bypass assembly also provides easy access thereto for sampling treated or untreated water, adding chemicals to the treatment system, and monitoring the pressure in the input and output lines extending from the treatment system.

In one form thereof, the present invention provides a water treatment system including an inlet adapted to receive untreated water, a treatment tank, an outlet adapted to dispense treated water (or untreated water in the event the treatment system is regenerating) and a bypass assembly removably connected to the inlet and outlet. The bypass assembly comprises a housing having a first opening adapted to receive the untreated water, a second opening adapted to dispense the treated water and an auxiliary port which comprises a third opening. At least one valve is disposed in the housing and is movable to a service position and a bypass position. When the at least one valve is positioned in the service position the housing defines a first fluid passage extending from the first opening through the at least one valve to the inlet and a second fluid passage extending from the outlet through the at least one valve to the second opening. Thus, when the at least one valve is positioned in the service position, the untreated water can be communicated from the first opening to the inlet and the treated water can be communicated from the outlet to the second opening. Further, when the at least one valve is positioned in the bypass position, the housing defines a third fluid passage extending from the first opening through the at least one valve to the second opening, the first and the second fluid passages being blocked in the bypass position. Thus, when the at least one valve is positioned in the bypass position the bypass valve assembly diverts the untreated water from the treatment tank. The bypass assembly further comprises a fourth fluid passage disposed in the housing, the fourth fluid passage extending from the third opening to the first opening. The fourth fluid passage is open when the at least one valve is positioned in the bypass position and the service position. A fitting is attached to the auxiliary port, whereby the auxiliary port may be used for a plurality of functions.

In a preferred form, the fitting comprises a check valve which is oriented to allow fluid flow into the third opening, whereby vacuum drawn on the first opening can be drawn into the third opening and through the check valve. In another preferred form, the fitting comprises a threaded fitting. Such a threaded fitting can be used to attach a boiler drain thereto to take a water sample, for example.

In another preferred form, the at least one valve comprises a cylindrical member which is rotatably disposed in a cylindrical bore disposed in the housing. The cylindrical bore has a pair of arms projecting therefrom which engage a lip defined by the cylindrical bore and serve to removable secure the cylindrical member in the housing. More preferably, the at least one valve comprises a pair of valves.

In another preferred form, at least one boss is disposed on the bypass valve assembly. The boss is located proximate one of the first and the second passages. The boss comprises a cylindrical lip projecting from the housing and forms a cylindrical hole which terminates at the housing, whereby the boss can be drilled through to fluidly access the one of the first and second passage.

One advantage of the present invention is that the auxiliary port may include a check valve that allows vacuum created in the water supply line to be drawn from ambient instead of being drawn on the water treatment system. A vacuum may be created in a water supply line, for example, when the line is being serviced at an elevation lower than that of the treatment system, thereby causing water pressure to be lost. Advantageously, the auxiliary port, when fitted with a check valve, prevents the treatment tank from imploding in such a situation.

Another advantage of the present invention is that the auxiliary port, because it includes an open end, provides a convenient injector access port for adding chemicals such as soda ash, caustic soda, potassium permanganate or chlorine. In addition to the addition of chemicals, the auxiliary port can be used to inject air for oxidation. Undesirably, prior art systems require disconnection of lines and possibly movement of the entire treatment system to accomplish these additions.

Yet another advantage of the bypass valve assembly of the present invention is that it is adapted to use commercially available fittings, such as those sold under the Uniflex® brand, available from Chemical Engineering Corp. Churubusco, Ind. Use of such fittings allows many options and configurations for the bypass valve assembly. For example, the bypass valve assembly may be configured with two sets of 90 degree elbows, which greatly reduces the distance it extends from the treatment system, thereby allowing the treatment system to be installed in a more restricted space than would otherwise be possible.

Still another advantage of the bypass valve of the present invention is that it can be configured with solenoid valves and linked to an alternate source of treated water, so that regeneration may be performed with treated water.

Still another advantage of the present invention is that the auxiliary port may provide an access for untreated water, for example, to be transported to an outdoor spigot. Similarly, the auxiliary port may be used to sample untreated water without requiring any fittings to be disconnected.

BRIEF DESCRIPTION OF DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 1:
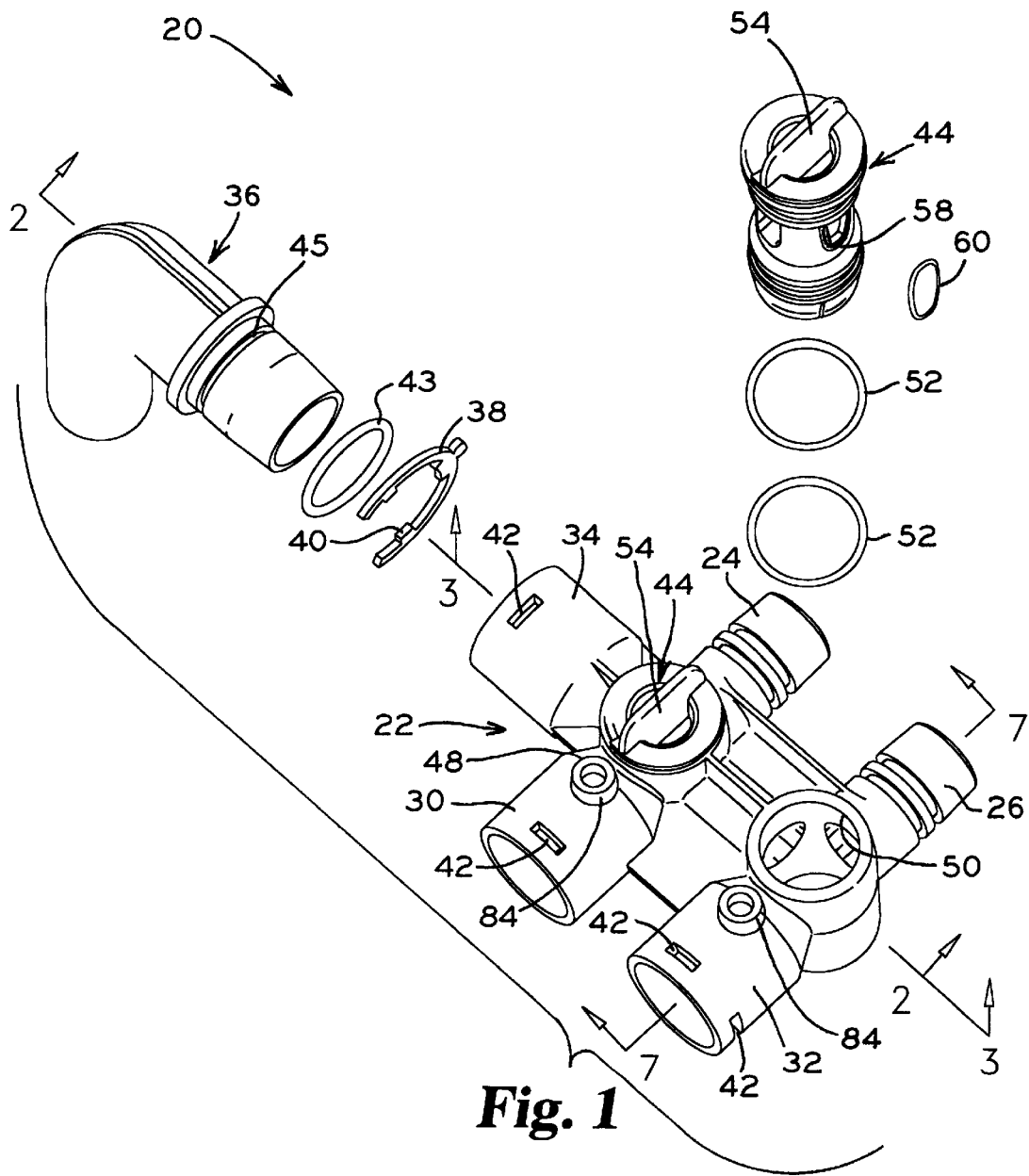
FIG. 1 is an exploded perspective view of a bypass valve assembly incorporating the present invention.

Corresponding reference characters indicate corresponding parts throughout the several views. The exemplification set forth herein illustrates preferred embodiments of the invention, in several forms, and such exemplifications are not to be construed as limiting the scope of the invention in any manner.

DETAILED DESCRIPTION

With reference to FIG. 1, bypass valve assembly 20 is adapted for use with a water treatment system 28 (a top portion of which is shown in FIGS. 8–15). Bypass assembly 20 includes a bypass assembly housing 22 having two pairs of couplers extending therefrom. Couplers 24 and 26 connect to the inlet and outlet fittings of water treatment system 28, respectively, whereas coupler 30 connects to an untreated water supply (not shown) and coupler 32 dispenses treated water to a supply line (not shown) adapted to receive same. Coupler 34 (also referred to herein as "auxiliary port 34") attaches to elbow fitting 36.

Couplers 24, 26, 30, 32 and 34 are adapted for easy connection and disconnection by means of a Uniflex® brand flexible spring clip system, which includes spring clip 38 used to connect elbow fitting 36 to coupler 34. Spring clip 38 includes tabs 40 that are received into corresponding slots 42 to mechanically lock the connection, whereas O-ring 43 fits into cylindrical recess 45 formed in elbow 36 to fluidly seal the connection of elbow 36 to coupler 34. The Uniflex® design is described in detail in U.S. Pat. No. 5,584,411, owned by the assignee of the present invention and hereby incorporated herein by reference. Uniflex® brand fittings are commercially available from Chemical Engineering Corp., Churubusco, Ind.

Figure 6:
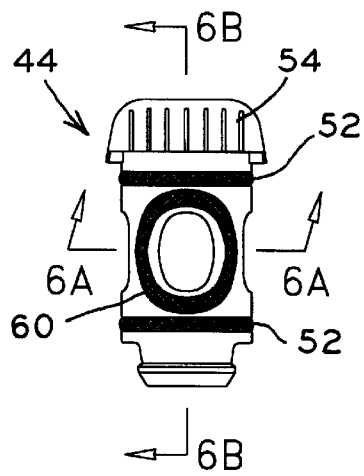
FIG. 6 is a side elevational view of a valve element in accordance with the present invention.
Figure 6A:
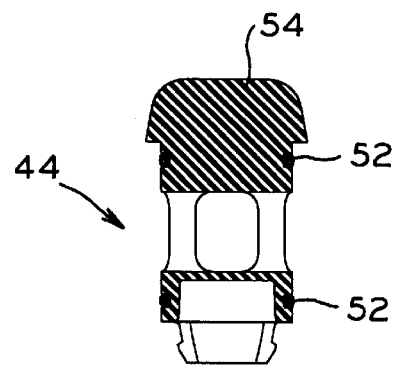
FIG. 6A is a sectional view of the valve element depicted in FIG. 6 taken along line 6A—6A.
Figure 6B:
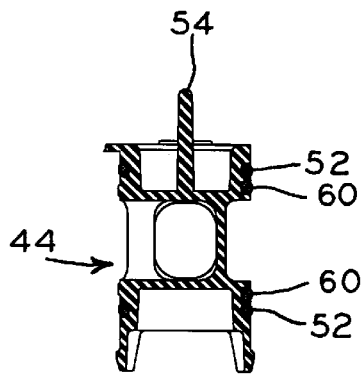
FIG. 6B is a second sectional view of the valve element of FIG. 6 taken along line 6B—6B.
Figure 7:
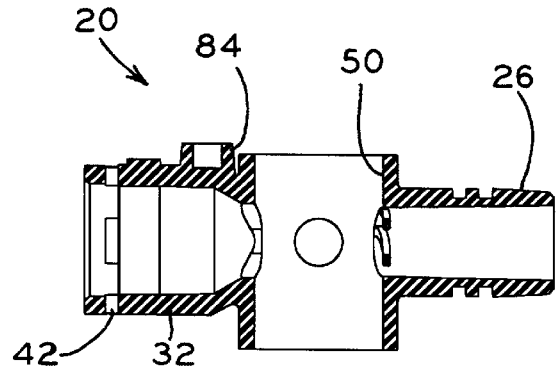
FIG. 7 is a sectional view taken along line 7—7 of FIG. 1.

Again referring to FIG. 1, bypass valve assembly 20 includes two identical cylindrical members, or control valves 44 which slidably and rotatably fit into corresponding cylindrically shaped bores 48 and 50 formed in housing 22. As shown in FIG. 1, and in more detail in FIGS. 6–6B, valves 44 include two O-rings 52 to seal the valves within the bores. The valves include handles 54 to facilitate manual rotation thereof. As can be appreciated from FIG. 3, valves 44 each include a T-shaped 56 conduit to selectively allow fluid flow therethrough, as described in more detail below. As shown in FIG. 1, valves 44 also include an oval-shaped recess 58 into which gasket 60 is disposed for selectively sealing the valve against an interior surface of housing 22.

Figure 2:
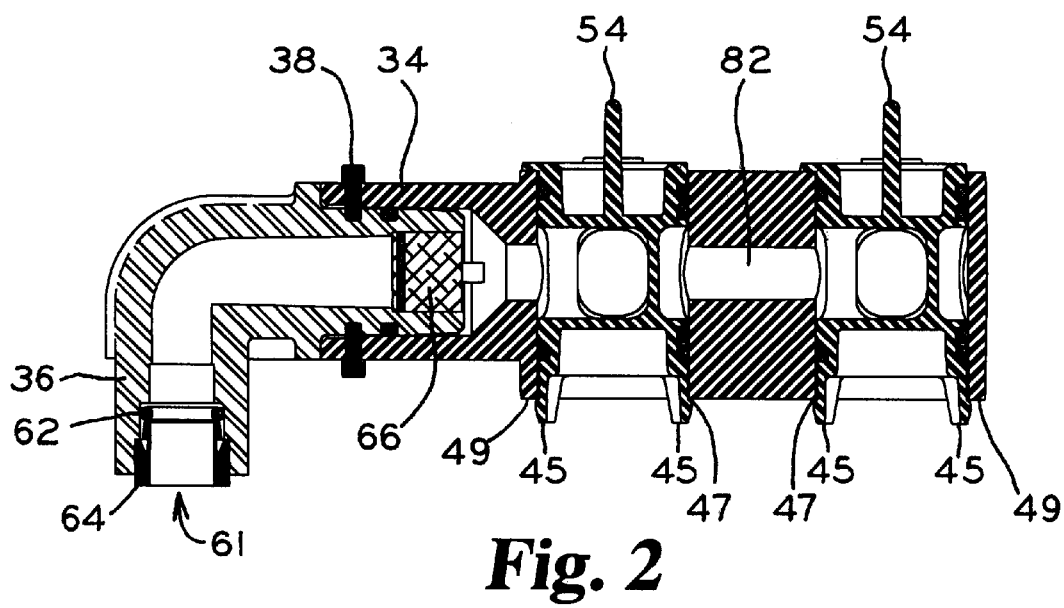
FIG. 2 is a sectional view of the bypass valve of FIG. 1 taken along line 2—2, shown in the service position.
Figure 2A:
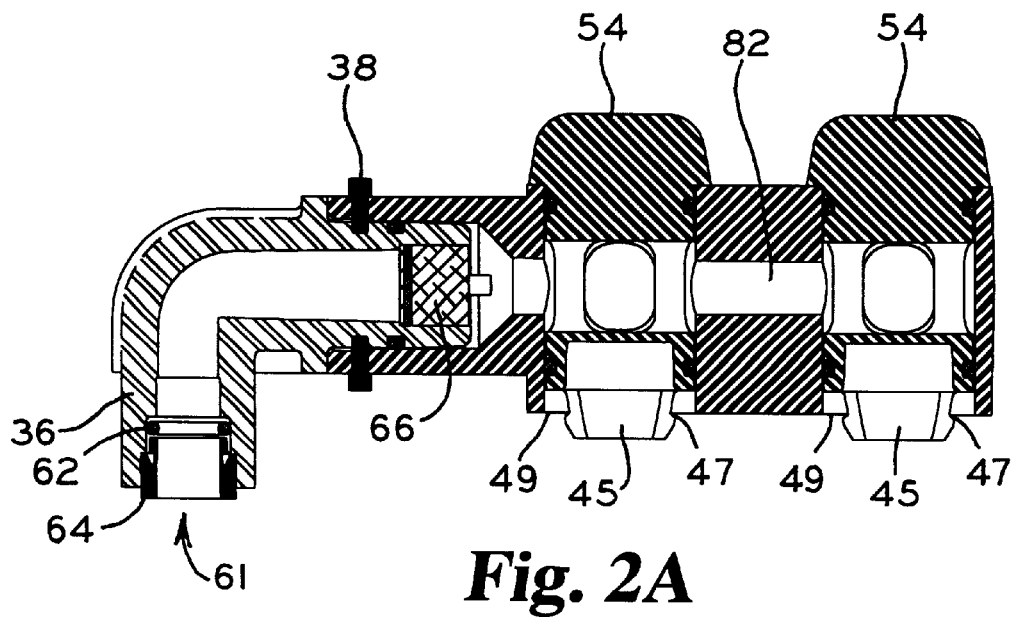
FIG. 2A is a sectional view of the bypass valve of FIG. 1 taken along line 2—2, shown in the bypass position.

As shown in FIGS. 2 and 2A, cylindrical control valves 44 each have a pair of integrally formed arms 45 projecting downwardly therefrom. The arms define notches 47 which engage edges 49 defined by cylindrical bores 48 and 50 and thereby secure valves 44 to the housing. Thus, as can be appreciated, one feature of embodiments incorporating the invention is that valves 44 are removably secured in the housing without requiring any additional fasteners.

Figure 4:
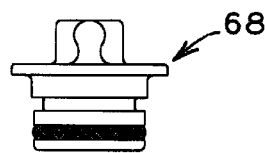
FIG. 4 is a side elevational view of an auxiliary port cap for use with the bypass assembly shown in FIG. 1.
Figure 5:
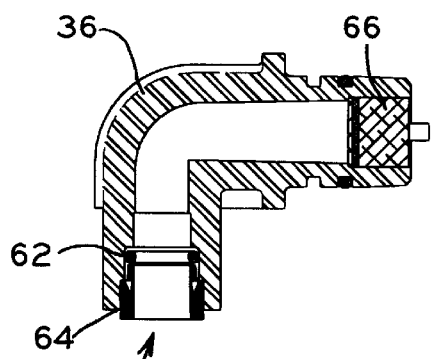
FIG. 5 is a sectional view illustrating an elbow portion of the bypass assembly shown in FIG. 1.

Again referring to FIG. 1, and more particularly to FIG. 2, coupler 34 serves as a multi-purpose auxiliary port for bypass valve assembly 20. Elbow fitting 36 is connected to coupler 34 by a Uniflex® fitting as described above, and includes a check valve 66 disposed at the proximal end of elbow fitting 36. A check valve suitable for use as check valve 66 is commercially available from Neoperl Corp., Model No. DW20/DN15, although other suitable check valves can be employed. To facilitate connection of other accessories, a coupling device is disposed at the distal end of elbow 36 and includes an O-ring 62 and a collet 64. One suitable coupling device 61 is commercially available from John Guest Company in the United Kingdom, although other suitable coupling devices could be employed by one of ordinary skill in the art. In lieu of the John Guest coupler, a threaded fitting, barbed fitting and pipe can be used. Further, in lieu of elbow 36, a cap 68 as shown in FIG. 4 can be removably installed into coupler 34 when the auxiliary port is not needed. Advantageously, cap 68 fits to the auxiliary port via the flexible spring clip system described above and sold under the Uniflex® trademark.

In operation, bypass assembly 20 can be positioned into a service or a bypass position. In the service position shown in FIGS. 1, 2 and 3 and 8, bypass assembly 20 includes a fluid passage shown by arrow 70 in FIG. 3 which extends from opening 72 in coupler 30 to an inlet of a water treatment system, such as inlet coupler 80 shown in FIG. 8. It is to be understood that the term "fluid," as used herein, shall be construed broadly to include gas and liquid. Fluid passage 70 is adapted for conveying untreated water from a water supply to the inlet of the water treatment system. Another fluid passage shown at arrow 74 in FIG. 3 dispenses the treated water from a water treatment system outlet, such as outlet coupler 82 shown in FIG. 8, to opening 76 defined by coupler 32.

Figure 3:
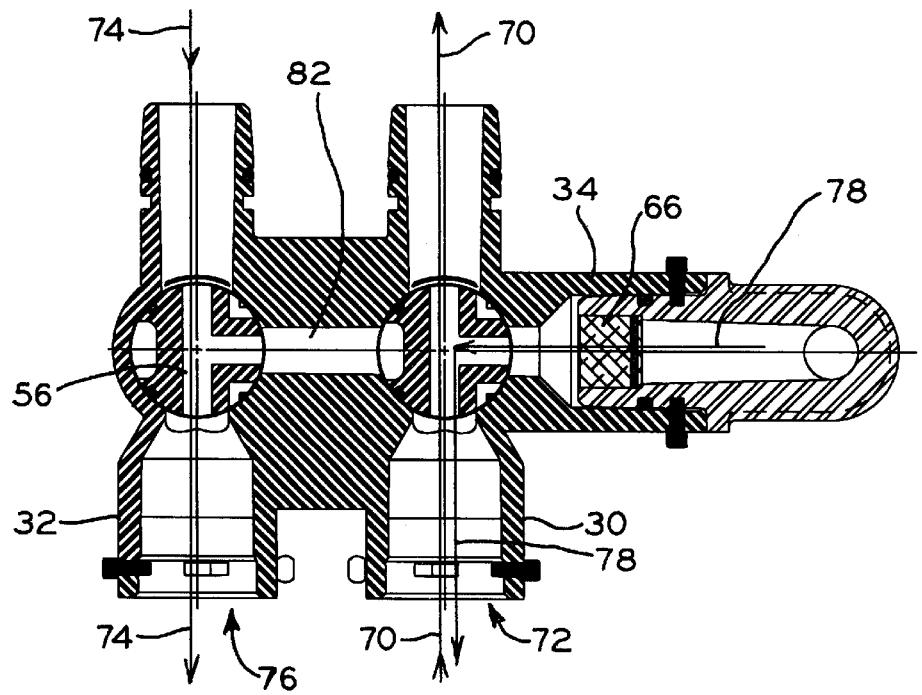
FIG. 3 is a sectional view of the bypass valve of FIG. 1 taken along line 3—3, shown in the service position.

While other options are possible as described below, one feature of the present invention provides an auxiliary port, i.e., coupler 34, having an open end and including check valve 66 therein. Check valve 66 allows fluid flow into coupler 34, but not vice versa. Advantageously, if the water supply line (not shown) which is attached to coupler 30 fails and begins to draw air in a direction opposite that of flow path 70, then air is automatically drawn through yet another fluid passage, namely, fluid passage 78 which is fluidly connected to fluid passage 70. In the event that the water supply fails and the water supply line draws a vacuum, fluid passage 78 would provide less resistance to fluid flow than fluid passage 70 since passage 78 draws from ambient whereas passage 70 is typically connected to a sealed treatment tank. As shown in FIG. 3, fluid passage 78 extends through the auxiliary port (coupler 34) to opening 72 and thereby prevents a vacuum from being created in the treatment tank (not shown), and as a result, prevents the treatment tank from imploding or cracking in the event of a failure of the water supply.

Figure 3A:
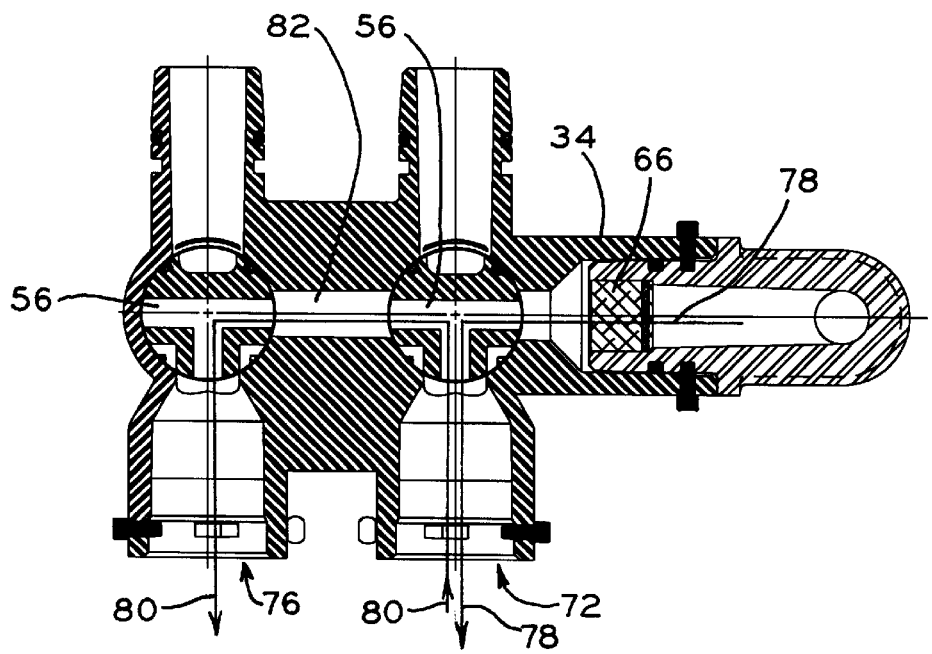
FIG. 3A is a sectional view of the bypass valve of FIG. 1 taken along line 3—3, shown in the bypass position.

In the bypass position shown in FIG. 3A, fluid passage 80 extends from opening 72, through channel 82 disposed centrally in bypass valve assembly 20, and then to opening 76. Fluid passage 80 provides a path for untreated water to pass though the bypass assembly without entering the treatment tank (not shown). As can be appreciated, the three-legged, or T-shaped, conduits formed in valves 44 are fluidly connected to one another when valves 44 are positioned in the bypass position as shown in FIG. 3A. As also can be appreciated with respect to FIGS. 3 and 3A, fluid passages 70 and 74 are blocked when valves 44 are positioned in the bypass position. However, fluid passage 78 remains open, even though conduit 56 has rotated by about 90°. It can thus be appreciated that the auxiliary port (coupler 34) is under pressure in both service and bypass positions, thereby providing an access for such safety devices as a vacuum breaker (check valve 66) and/or a pressure relief valve, even when the treatment equipment is "off-line."

Another feature of the present invention is that bosses 84 are pre-formed on each of couplers 30 and 32 as shown in FIG. 1. That is, bosses 84 are located proximate fluid passages 70 and 74. Bosses 84 are formed as a cylindrical lip projecting from the housing and forming a cylindrical hole which terminates at the housing. Bosses 84 can later be drilled through, threaded and tapped with auxiliary components. For example, boss 84 on coupler 32 can be tapped with a fitting that allows sampling of treated water, or a pressure gauge to determine the pressure in the outgoing line or incoming line. Bosses 84 enhance the flexibility of the bypass valve assembly, and one of ordinary skill would readily recognize many uses therefor.

For example, it may be useful to measure the pressure at inlet coupler 30 if the system is connected to a pump to determine whether the incoming pressure is sufficient. As another example, by drilling and then tapping both bosses 84 with pressure gauges (not shown), one can measure the pressure drop across the system, which provides a useful diagnostic tool. Still further, boss 84 disposed on coupler 30 could be tapped and fitted with a finger valve (not shown) so that untreated water is bled from coupler 30 fed to the outgoing treated water line, thereby providing a mixture of treated and untreated water. Such would be useful when using bypass assembly 20 with a water softener and only partially softened water is desired.

Figure 9:
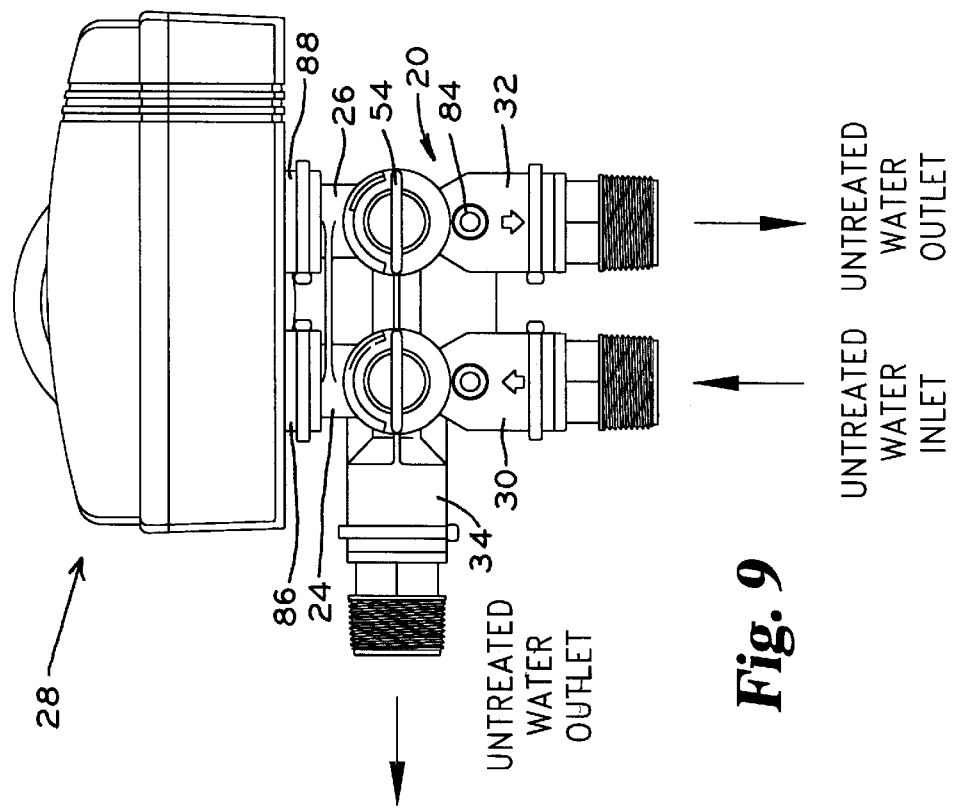
FIGS. 8–12 are diagrammatic views illustrating various modes of operation of embodiments incorporating the present invention.
Figure 8:
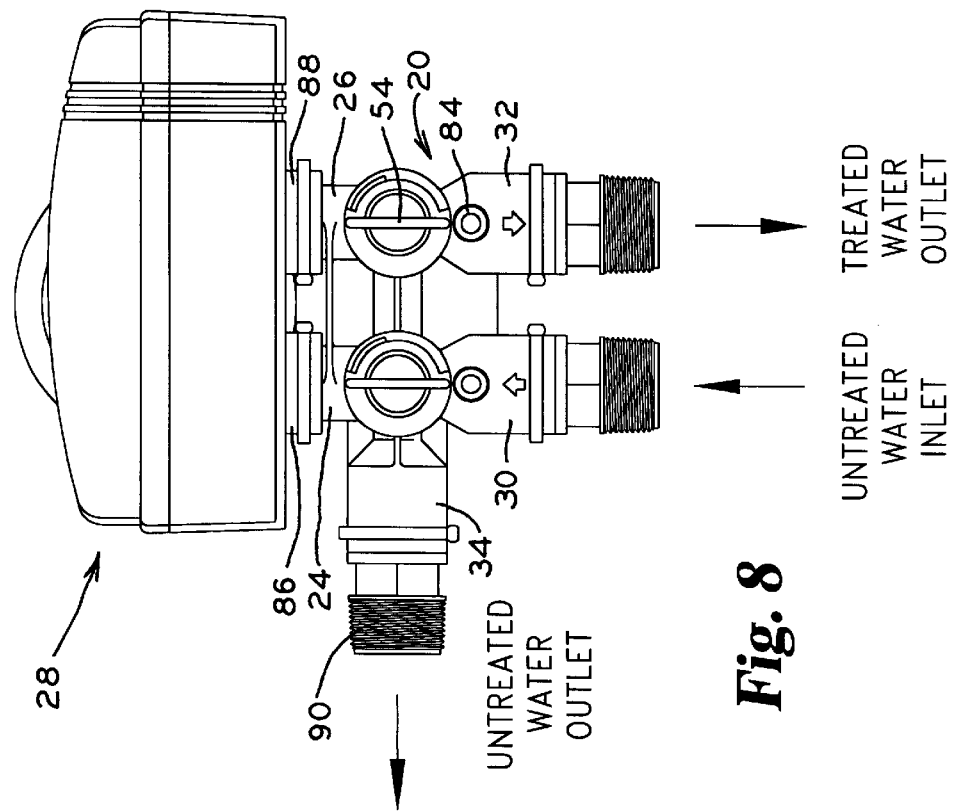

Another use of bypass valve assembly 20 is shown in FIG. 8, wherein couplers 24 and 26 are connected to inlet 86 and outlet 88, respectively, of treatment system 28 (top portion of which is shown in FIG. 8). As shown, the auxiliary port (coupler 34) is plumbed as an outlet having a threaded fitting 90 connected thereto. The auxiliary port therefore provides a source of untreated water, which would be desirable, for example, for exterior spigots, irrigation, or for providing access for monitoring the condition of the untreated water. As shown in FIG. 9, the auxiliary port 34 is under pressure in the bypass position, so that installed safety devices such as a pressure relief valve or a vacuum breaker are always operational.

Figure 10:
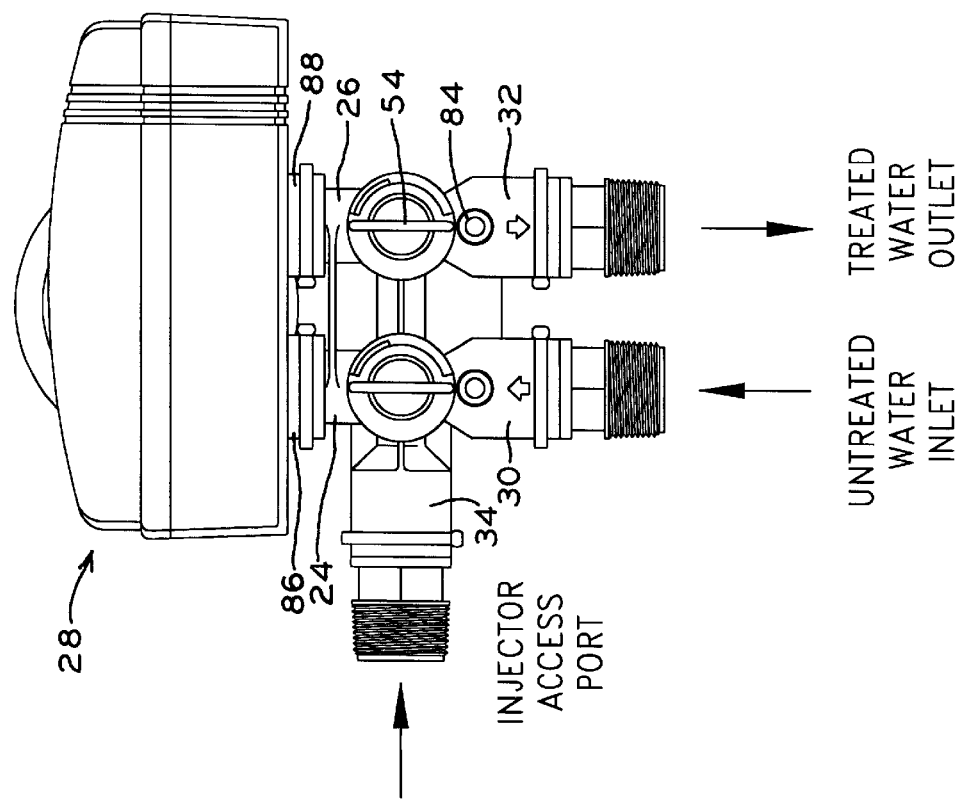

FIG. 10 illustrates yet another example of the flexibility of the bypass valve assembly, wherein auxiliary port 34 can be used as an injector access port for adding chemicals such as soda ash, caustic soda, potassium permanganate or chlorine. In addition to adding chemicals, the auxiliary port can be used to inject air for oxidation.

Figure 11:
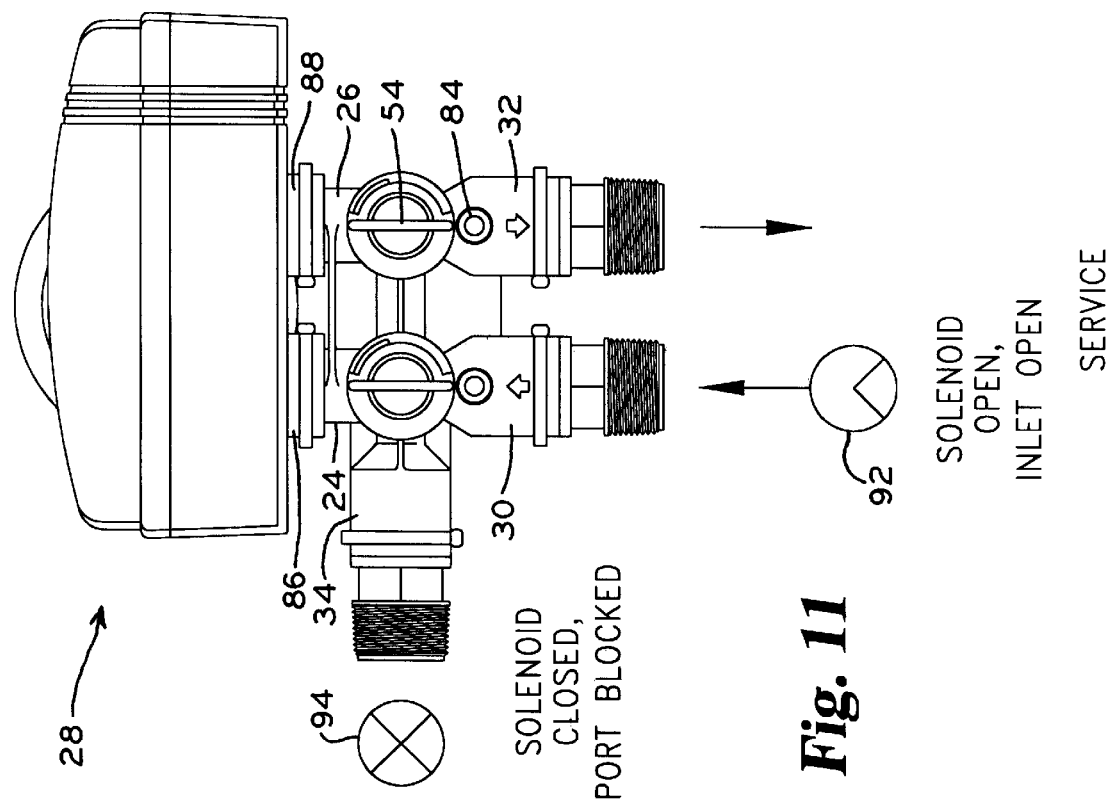
Figure 12:
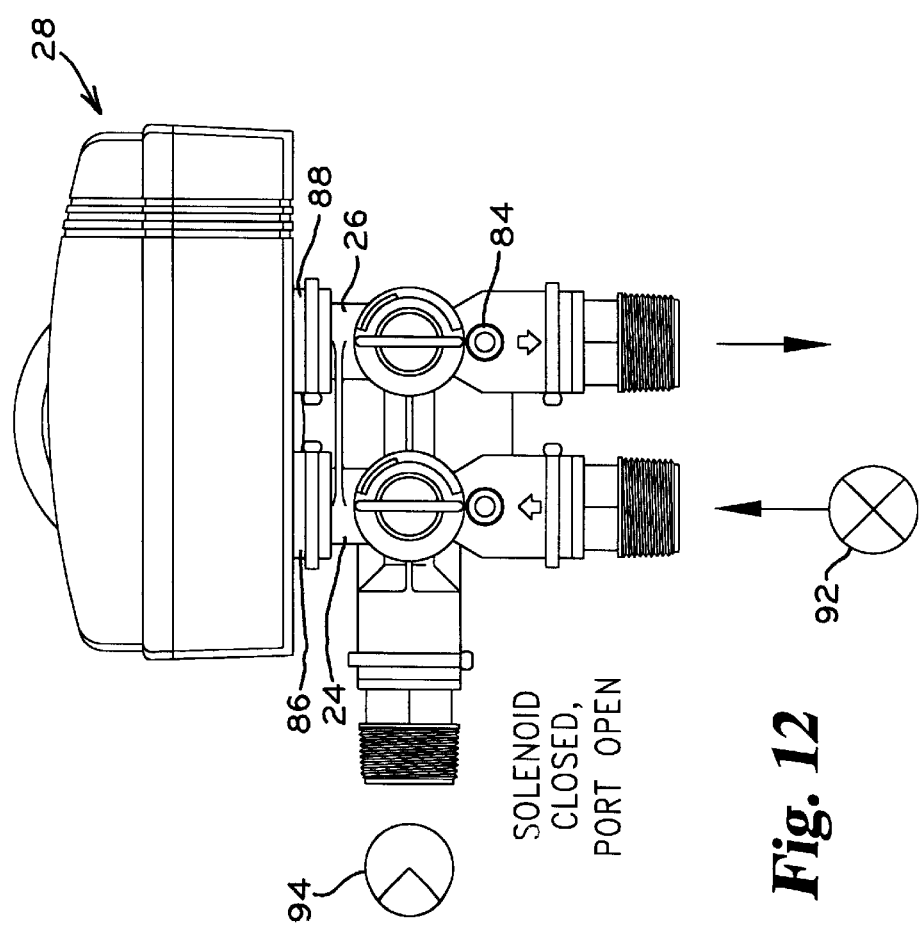

FIGS. 11 and 12 illustrate an embodiment wherein the bypass valve assembly provides an alternate inlet access. Solenoid 92 is installed at coupler 30 and solenoid 94 is installed at auxiliary port 34. As shown in FIG. 11, during service, solenoid 94 is closed and solenoid 92 is open, thereby allowing the main water source to be treated. As shown in FIG. 12, during regeneration of the water treatment system, solenoid 94 is open whereas solenoid 92 is closed. Auxiliary port 34 can be connected to a source of treated water such that water treatment system 28 uses treated water to regenerate. Of course, solenoids 92 and 94 must be operatively linked to the regeneration cycle of the water treatment system, which is easily accomplished by one of ordinary skill.

As can be appreciated by one of ordinary skill in the art, many different "fittings" can be attached to auxiliary port 34 for various auxiliary functions. For purposes of this specification, then, the term "fitting" is to be construed broadly to include any structure which, when attached to or included with auxiliary port 34, provides a function other than closing the auxiliary port. Thus, the term "fitting" includes, but is not limited to, a check valve, a solenoid valve, an elbow, a threaded pipe, a drain pipe, or any of the parts included with the flexible spring clip system sold under the Uniflex® name.

Figure 13:
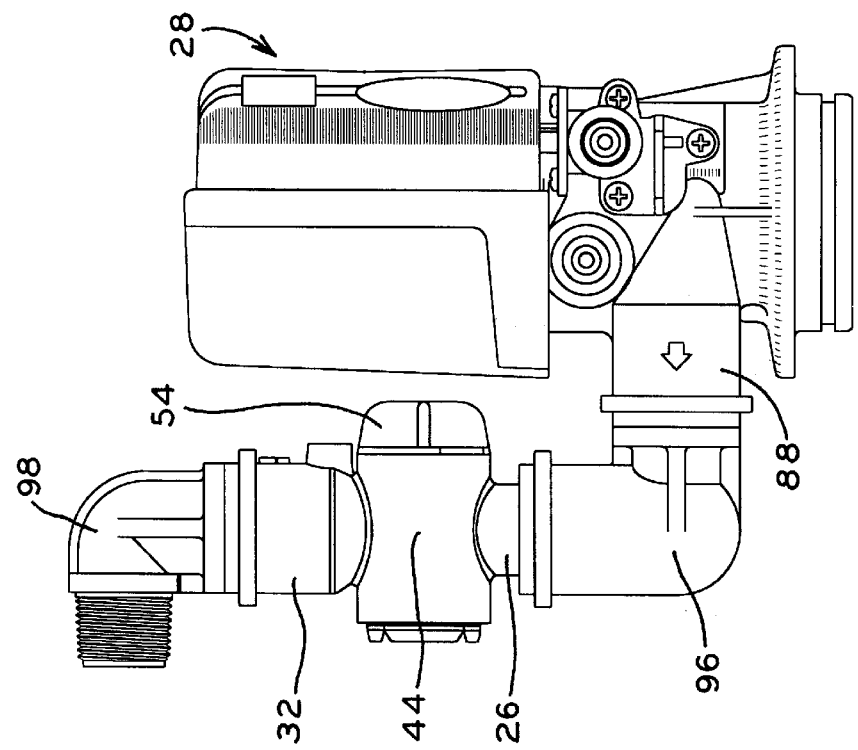
FIG. 13 is a side elevational view of an embodiment of a bypass assembly and a portion of the top of a water treatment system main control in which the design incorporates a slim profile adapted for narrow spaces.

FIG. 13 illustrates an embodiment adapted for a narrow space, such as is frequently needed when a water softener is placed close to a wall. A 90 degree elbow fitting 96 is connected between coupler 26 and outlet 88 of water treatment system 28. A similar 90 degree elbow (not shown in FIG. 13) is connected between coupler 24 and the inlet fitting of the water treatment system. Similarly, a 90 degree elbow fitting 98 is connected to coupler 32 and a similar 90 degree elbow (not shown in FIG. 13) is connected to coupler 30 of bypass valve assembly 20. Uniflex® brand elbow fittings are suitable for use as elbows 96 and 98 and, as noted above, are available from Chemical Engineering Corp.

Figure 15:
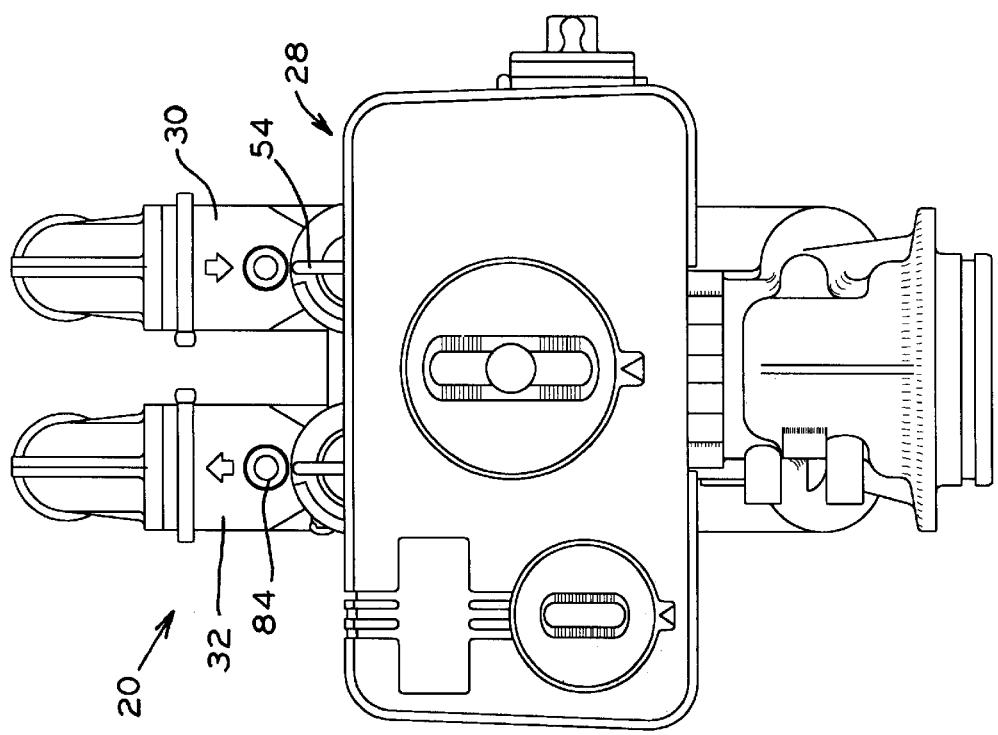
FIG. 15 is a front view of the bypass assembly and water treatment system control of FIG. 14.
Figure 14:
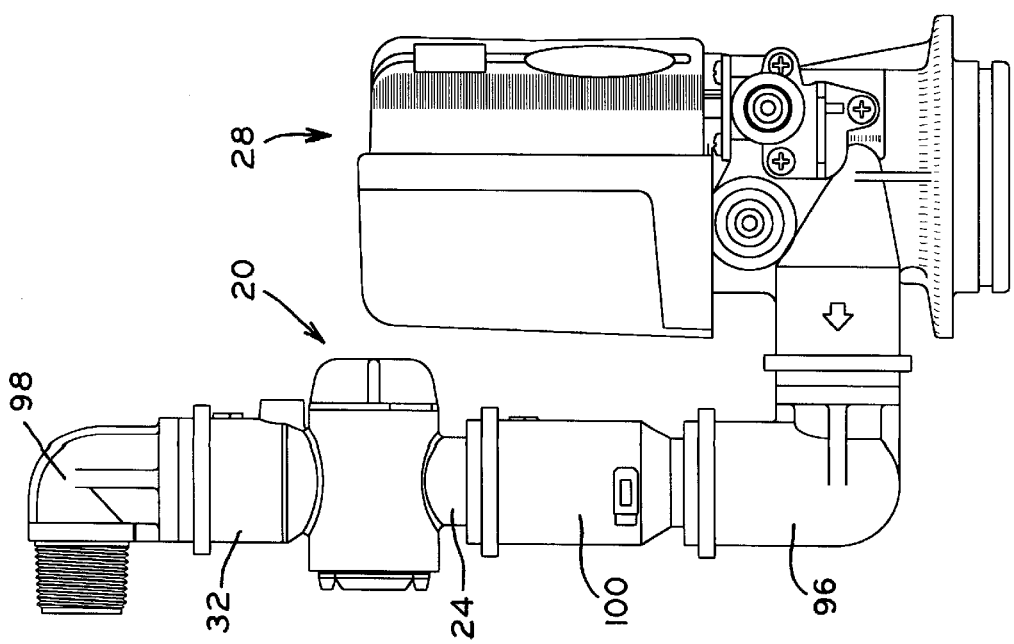
FIG. 14 is a side elevational view of an embodiment of a bypass assembly and a portion of a water treatment system main control which includes a slim profile and a flow meter.

FIGS. 14 and 15 illustrate another embodiment which is similar to that shown in FIG. 13, except that flow meters 100 (only one shown) are connected to the bypass valve assembly. As shown in FIG. 14, flow meter 100 is connected between coupler 24 and elbow 96. Flow meter 100 measures the flow of water through coupler 32 and electronically transmits the data to a printed circuit board which registers accumulated flow and causes regeneration at appropriate times.

While this invention has been described as having an exemplary design, the present invention may be further modified within the spirit and scope of this disclosure. This application is therefore intended to cover any variations, uses, or adaptations of the invention using its general principles. For example, one of ordinary skill in the art may modify the embodiment disclosed hereinabove to use a single control valve to switch from the bypass to the service positions, and vice versa. This application is intended to cover such departures from the present disclosure as come within known or customary practice in the art to which this invention pertains.

What is claimed is:

1. A water treatment system including an inlet adapted to receive untreated water, a treatment tank, an outlet adapted to dispense treated water and a bypass assembly removably connected to said inlet and said outlet, said bypass assembly comprising:

a housing having a first opening, a second opening and an auxiliary port which comprises a third opening;

at least one valve disposed in said housing and movable to a service position and a bypass position;

wherein when said at least one valve is positioned in said service position said housing defines a first fluid passage extending from said first opening through said at least one valve to said inlet and said housing further defines a second fluid passage extending from said outlet through said at least one valve to said second opening, whereby the untreated water can be communicated from said first opening to said inlet and the treated water exiting said tank can be communicated from said outlet to said second opening;

further wherein when said at least one valve is positioned in said bypass position said housing defines a third fluid passage extending from said first opening through said at least one valve to said second opening, said at least one valve blocking said first and said second fluid passages in said bypass position, whereby in said bypass position said bypass valve assembly diverts the untreated water from said treatment tank;

said bypass assembly further comprising a fourth fluid passage disposed in said housing, said fourth fluid passage extending from said third opening to said first opening, said fourth fluid passage being open when said at least one valve is positioned in said bypass position and said service position; and said auxiliary port comprising a fitting, whereby said auxiliary port can be utilized for at least one auxiliary function.

2. The water treatment system of claim 1, wherein said fitting comprises a check valve oriented to allow fluid flow into said third opening, whereby suction drawn on said first opening can be relieved.

3. The water treatment system of claim 2, further comprising a tube coupler connected to said auxiliary port, said tube coupler housing said check valve.

4. The water treatment system of claim 1, wherein said fitting comprises an elbow.

5. The water treatment system of claim 1, wherein said fitting comprises a solenoid.

6. The water treatment system of claim 1, wherein said fitting comprises a male pipe thread.

7. The water treatment system of claim 1, wherein said fitting comprises a flexible spring clip and slots disposed in said housing adapted to receive said spring clip.

8. The water treatment system of claim 1, wherein said at least one valve comprises a cylindrical member which is rotatably disposed in a cylindrical bore disposed in said housing, said cylindrical member having an arm projecting therefrom, said arm engaging an edge defined by said cylindrical bore and thereby removably securing said cylindrical member in said housing.

9. The water treatment system of claim 8, wherein said arm comprises a pair of arms that are integrally formed with said cylindrical member.

10. The water treatment system of claim 1, wherein said at least one valve comprises a pair of valves.

11. The water treatment system of claim 1, further comprising at least one boss disposed on said bypass valve assembly, said boss located proximate one of said first and said second passages, said boss comprising a cylindrical lip projecting from said housing and forming a cylindrical hole which terminates at said housing, whereby said boss can be drilled through to fluidly access said one of said first and said second passages.

12. The water treatment system of claim 11, wherein said at least one boss comprises first and second bosses, said first boss disposed proximate said first fluid passage and said second boss located proximate said second fluid passage.

13. A water treatment system including an inlet adapted to receive untreated water, a treatment tank, an outlet adapted to dispense treated water and a bypass assembly removably connected to said inlet and said outlet, said bypass assembly comprising:

a housing having a first coupler defining a first opening and a second coupler defining a second opening;

at least one valve disposed in said housing and movable to a service position and a bypass position;

wherein when said at least one valve is positioned in said service position said housing defines a first fluid passage extending from said first opening through said at least one valve to said inlet and said housing further defines a second fluid passage extending from said outlet through said at least one valve to said second opening, whereby the untreated water can be communicated from said first opening to said inlet and the treated water can be communicated from said outlet to said second opening;

further wherein when said at least one valve is positioned in said bypass position said housing defines a third fluid passage extending from said first opening through said at least one valve to said second opening, said at least one valve blocking said first and said second fluid passages in said bypass position, whereby in said bypass position said bypass valve assembly diverts the untreated water from said treatment tank; and said housing further comprising at least one boss disposed on one of said first and said second couplers, said boss comprising a cylindrical lip projecting from said housing and forming a sealed cylindrical hole which terminates at said housing, whereby said boss can be drilled through to fluidly access one of said first and said second passages.

14. The water treatment system of claim 13, wherein said at least one boss comprises first and second bosses, said first boss disposed on said first coupler and said second boss disposed on said second coupler.

15. The water treatment system of claim 13, further comprising an auxiliary port which comprises a third opening.

16. A water treatment system including an inlet adapted to receive untreated water, a treatment tank, an outlet adapted to dispense treated water and a bypass assembly removably connected to said inlet and said outlet, said bypass assembly comprising:

a housing having a first opening and a second opening;

at least one valve disposed in said housing and movable to a service position and a bypass position;

wherein when said at least one valve is positioned in said service position said housing defines a first fluid passage extending from said first opening through said at least one valve to said inlet and said housing further defines a second fluid passage extending from said outlet through said at least one valve to said second opening, whereby the untreated water can be communicated from said first opening to said inlet and the treated water can be communicated from said outlet to said second opening;

further wherein when said at least one valve is positioned in said bypass position said housing defines a third fluid passage extending from said first opening through said at least one valve to said second opening, said at least one valve blocking said first and said second fluid passages in said bypass position, whereby in said bypass position said bypass valve assembly diverts the untreated water from said treatment tank; and said at least one valve comprising a cylindrical member which is rotatably disposed in a cylindrical bore disposed in said housing, said cylindrical member having an integrally formed arm projecting therefrom, said arm engaging an edge defined by said cylindrical bore and thereby removably securing said cylindrical member in said housing, whereby no separate fasteners are required to secure said at least one valve in said housing, wherein said at least one valve comprises a pair of valves, a first one of said valves being disposed in line with said first fluid passage and a second one of said valves being disposed in line with said second fluid passage.

17. The water treatment system of claim 16, wherein said arm comprises a pair of arms.

18. The water treatment system of claim 16, wherein said arm comprises a notch which receives said edge.

19. The water treatment system of claim 16, further comprising an auxiliary port which comprises a third opening.

* * * * *